Oct. 30, 1923.
I. A. CROCKER
1,472,747
HOSE REEL
Filed March 16, 1922
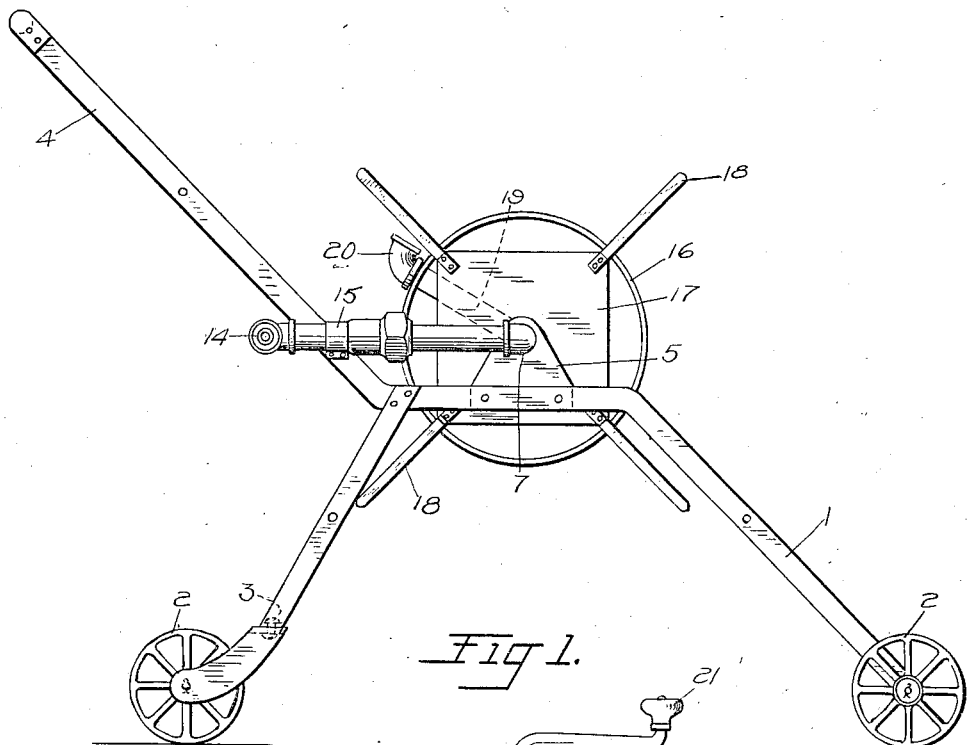
Fig 1.
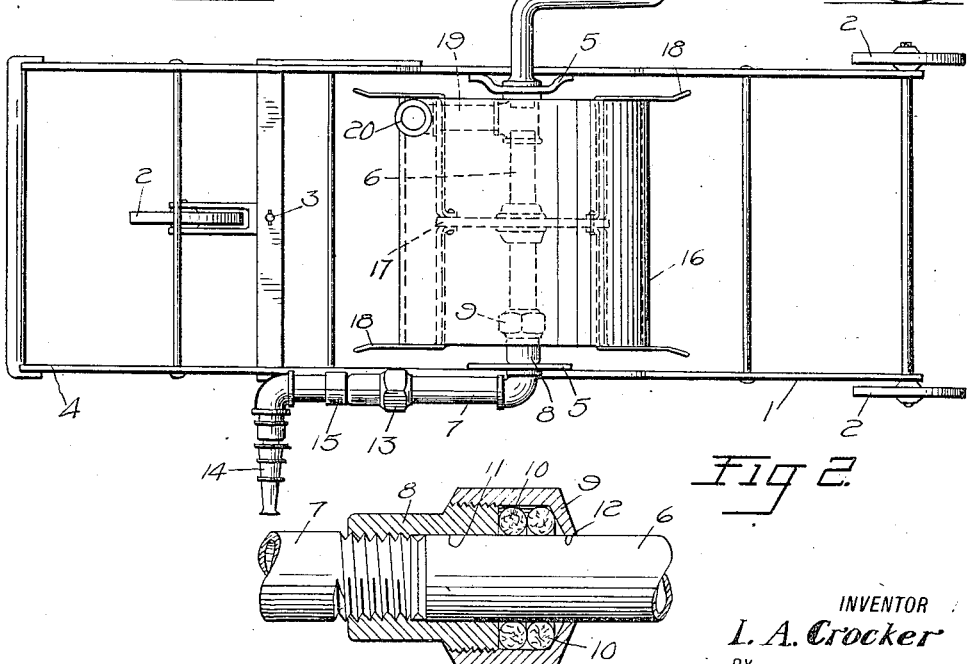
Fig 2.
Fig 3.
INVENTOR
I. A. Crocker
BY
Munn & Co.
ATTORNEYS Patented Oct. 30, 1923.

1,472,747

UNITED STATES PATENT OFFICE.

IRVIN A. CROCKER, OF KANKAKEE, ILLINOIS.

HOSE REEL.

Application filed March 16, 1922. Serial No. 544,150.

*To all whom it may concern:*

Be it known that I, IRVIN ADELBERT CROCKER, a citizen of the United States, and a resident of Kankakee, in the county of Kankakee and State of Illinois, have invented a new and useful Improvement in Hose Reels, of which the following is a full, clear, and exact description.

My invention relates to improvements in hose reels, and it consists in the combinations, constructions, and arrangements herein described and claimed.

An object of my invention is to provide a hose reel which has a spraying nozzle secured thereto, whereby the device may be moved to any place desired and be left there, the nozzle directing the water on the desired spot.

A further object of my invention is to provide a device of the character described in which the unused portion of the hose may be wound thereon, the end of the hose being in communication with the nozzle which is carried by the device, whereby the nozzle of the hose may be moved to any place desired without the necessity of moving a great portion of the unused hose over the ground.

A further object of my invention is to provide a device of the character described in which the device may be moved to any desired place and be ready for instant use, the extra length of hose not required, being wound upon the device.

A further object of my invention is to provide a device of the character described in which the nozzle is secured to the device in a novel manner, whereby the nozzle may be elevated to the desired angle.

A further object of my invention is to provide a device of the character described in which the hose may be readily drained of water when wound thereon.

A further object of my invention is to provide a device of the character described which is simple in construction, and which is not likely to easily get out of order.

Other objects and advantages will appear in the following specification, and the novel features of the invention will be particularly pointed out in the appended claim.

My invention is illustrated in the accompanying drawings, forming part of this application, in which Figure 1 is a side elevation of the device, Figure 2 is a plan view of the device, and Figure 3 is an enlarged detail of the pipe coupling.

In carrying out my invention, I provide a frame 1 which is mounted on wheels 2. The rear wheel of the device is pivoted at 3, whereby the operator can guide the device in the desired direction. The frame 1 has a handle 4 which may be grasped by the operator, so that the operator can readily guide the device. The frame 1 has bearings 5 in which is journalled a section of a water pipe 6 and a pipe 7.

The water pipe 6 is journalled at its other end in a sleeve 8 (see Figure 3). The sleeve 8 is carried by the pipe 7, and in turn carries a housing 9. The housing 9 has a pair of ring-shaped gaskets 10 therein. It will be observed that the end of the pipe 6 abuts the pipe 7, and that the pipe 6 is snugly received in the bore 11 of the sleeve 8, and in the opening 12 of the housing 9. This construction provides a water-tight joint in which the pipe 6 may be rotated with respect to the pipe 7. A like water-tight joint 13 is provided in the pipe 7, whereby the water nozzle 14, carried by the outer end of the pipe 7, may be swung into the desired position with respect to the pipe 7. The pipe 7 is secured to the frame 1 by means of the bearing 5 and a clamp 15.

A hose reel 16, preferably cylindrical in shape, is rotatably disposed in the frame 1, and is rigidly secured to the axle pipe 6. As clearly shown in Figures 1 and 2, the reel 16 is composed of a cylindrical member and a square plate 17, the plate being disposed within the cylinder and midway between the ends thereof. The plate is rigidly secured to the axle pipe 6 by any means. The plate 17 has a plurality of arms secured thereto at the corners thereof, these arms being bent outwardly so as to engage with the inner surface of the cylinder, and then being bent at right angles so as to form guide arms 18. These arms 18 prevent the hose (not shown) from slipping off from the reel 16. A branch pipe 19 communicates with the axle pipe 6 and terminates in an elbow 20 which is disposed adjacent to the outer periphery of the reel (see Figure 1). The end of the water hose (not shown) may be secured to the elbow 20, and the handle 21, which is operatively secured to the reel 16, may be rotated so as to wind the hose upon the reel 16. It will be apparent from this construction that the hose is always in communication with the nozzle 14, and that any length of hose may be wound upon the reel 16 without effecting, in the slightest, the operation of the device.

From the foregoing description of the various parts of the device, the operation thereof may be readily understood. The free end of the hose which is not connected to the elbow 20, may be connected to the sill-cock (not shown), and the sill-cock opened so as to permit the water to enter the hose. If it is desired not to have the water ejected from the nozzle 14, the nozzle 14 may be closed. The device may now be moved to the desired position, the reel 16 unwinding the hose from the device as needed. As the reel 16 rotates, the pipe axle 6 will freely rotate in the sleeve 8. The nozzle 14 may now be swung to the desired angle, and may be opened so as to permit the water from the hose to pass therethrough. If desired, the device may be left without further attention until it is necessary to again move the device. It is obvious that the device may be moved to any position desired, the hose being wound upon or unwound from the reel 16 as desired. This obviates the necessity of handling a wet and muddy hose. When the lawn is being sprinkled, the nozzle 14 may be closed and the handle 21 rotated as the device is moved towards the sill-cock. The hose is wound upon the reel 16 as the device is moved towards the source of supply. The hose may then be disconnected from the sill-cock. To drain the hose when it is on the reel, it is only necessary to rotate the reel slowly and to open the nozzle 14, whereupon the water in the hose will be conveyed out through the open end of the hose. The device may now be stored until further use thereof is required.

From the foregoing, it will be observed that the device is simple in operation, and obviates the handling of a long line of hose. The device is readily moved from place to place, and is ready for instant use when in the desired location.

I claim:

A device of the type described comprising a frame, a crank rotatably carried by said frame, a water pipe carried by said frame and being aligned with the axis of rotation of said crank, a stub pipe rigidly secured to said crank and being rotatably secured to said water pipe, a disc rigidly secured to said stub pipe, a hose carrying cylinder carried by said disc, arms fastened to said disc and extending radially from the sides of said cylinder, and a pipe extending at right angles to said stub pipe and communicating therewith, said pipe terminating adjacent to the outer surface of said cylinder.

IRVIN A. CROCKER.